US008196982B1

(12) United States Patent
Crunkelton

(10) Patent No.: US 8,196,982 B1
(45) Date of Patent: Jun. 12, 2012

(54) SOD HANDLING DEVICE

(76) Inventor: William S Crunkelton, Avon Park, FL (US)

(*) Notice: Subject to any disclaimer, the term of this patent is extended or adjusted under 35 U.S.C. 154(b) by 417 days.

(21) Appl. No.: 12/590,057

(22) Filed: Nov. 2, 2009

(51) Int. Cl.
*A01B 1/16* (2006.01)
*A01C 1/00* (2006.01)

(52) U.S. Cl. ............................................. 294/61; 294/16

(58) Field of Classification Search ............ 294/11, 294/15, 16, 17, 28, 61, 67.1, 107, 168, 169; 172/19, 20; 414/25, 618, 736; 47/58.1 R, 47/901
See application file for complete search history.

(56) References Cited

U.S. PATENT DOCUMENTS

| | | | | |
|---|---|---|---|---|
| 246,120 A * | 8/1881 | Goodyear | | 294/33 |
| 1,467,192 A * | 9/1923 | Page | | 294/17 |
| 2,572,499 A * | 10/1951 | Light | | 294/107 |
| 2,720,886 A * | 10/1955 | Byczek | | 294/107 |
| 3,326,592 A * | 6/1967 | Pelton | | 294/61 |
| 3,633,958 A * | 1/1972 | Mesrobian | | 294/61 |
| 3,901,324 A * | 8/1975 | Fisher | | 172/19 |
| 4,525,121 A * | 6/1985 | Cawley | | 294/107 |
| 6,112,680 A * | 9/2000 | Hummer | | 172/19 |
| 7,407,362 B2 * | 8/2008 | Brouwer et al. | | 414/736 |

* cited by examiner

*Primary Examiner* — Paul T Chin

(57) ABSTRACT

A hand held device is disclosed which may be manipulated with a single hand of the user to engage, transport and release a piece of sod. Curved sod penetration members are pivotally displaced to enter and to leave the piece of sod from opposing directions. This pivotal displacement of the curved penetration portions of the sod penetration members act to minimize any disturbance to the piece of sod which might damage the piece of sod. A dual handle arrangement provides of easy use of the device. An upper handle is utilized to place the device and for the device to engage the piece of sod while a lower handle is then utilized to transport the device with the piece of sod attached thereto with a shifting of hand position from the lower handle to the upper handle causing release of the piece of sod from the device.

19 Claims, 7 Drawing Sheets

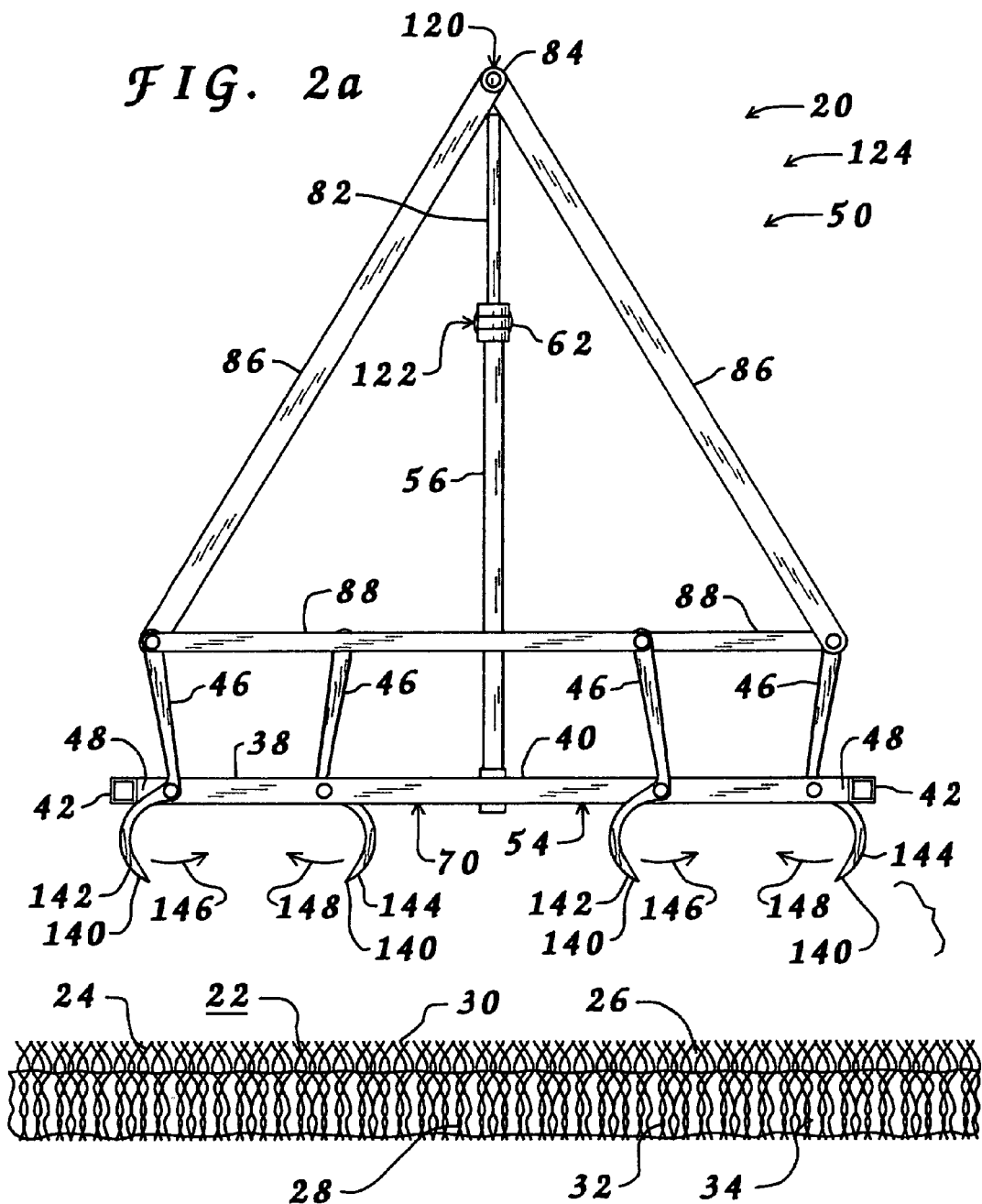

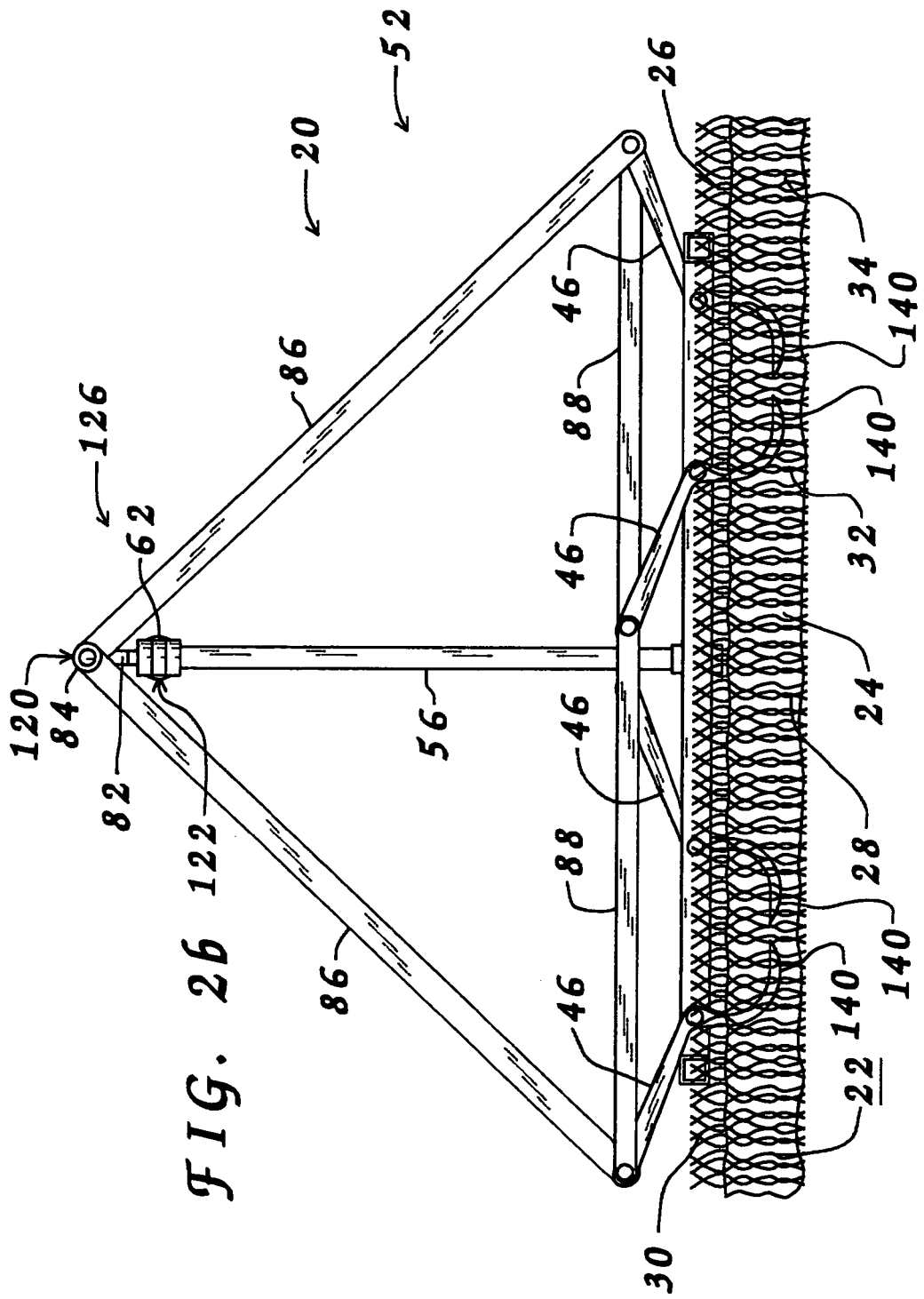

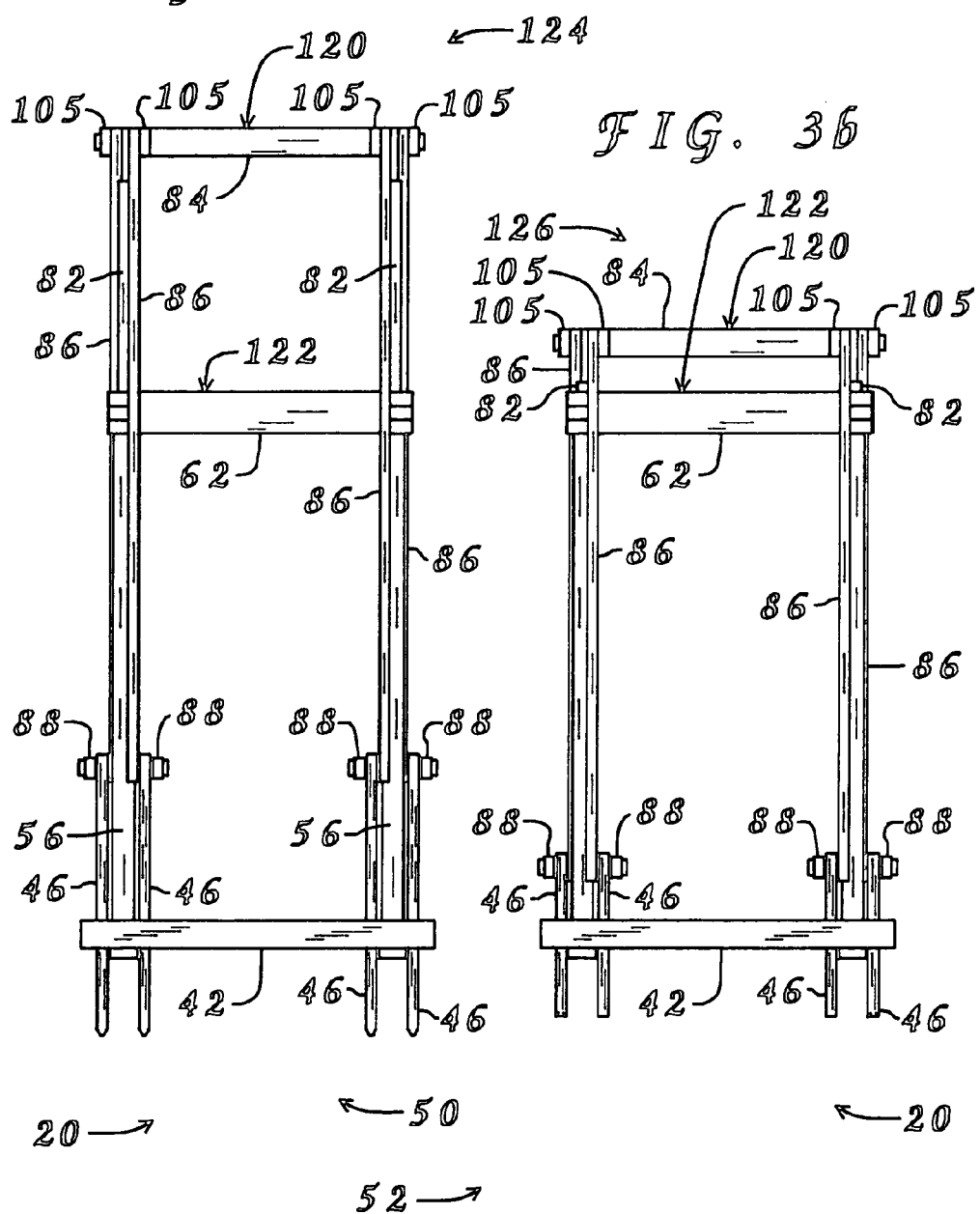

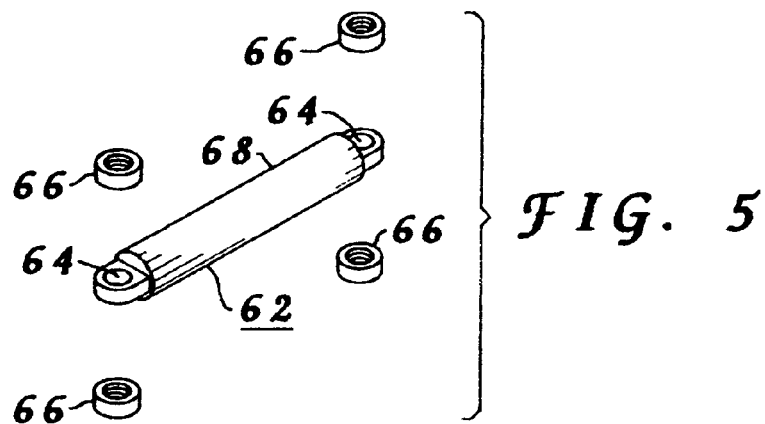
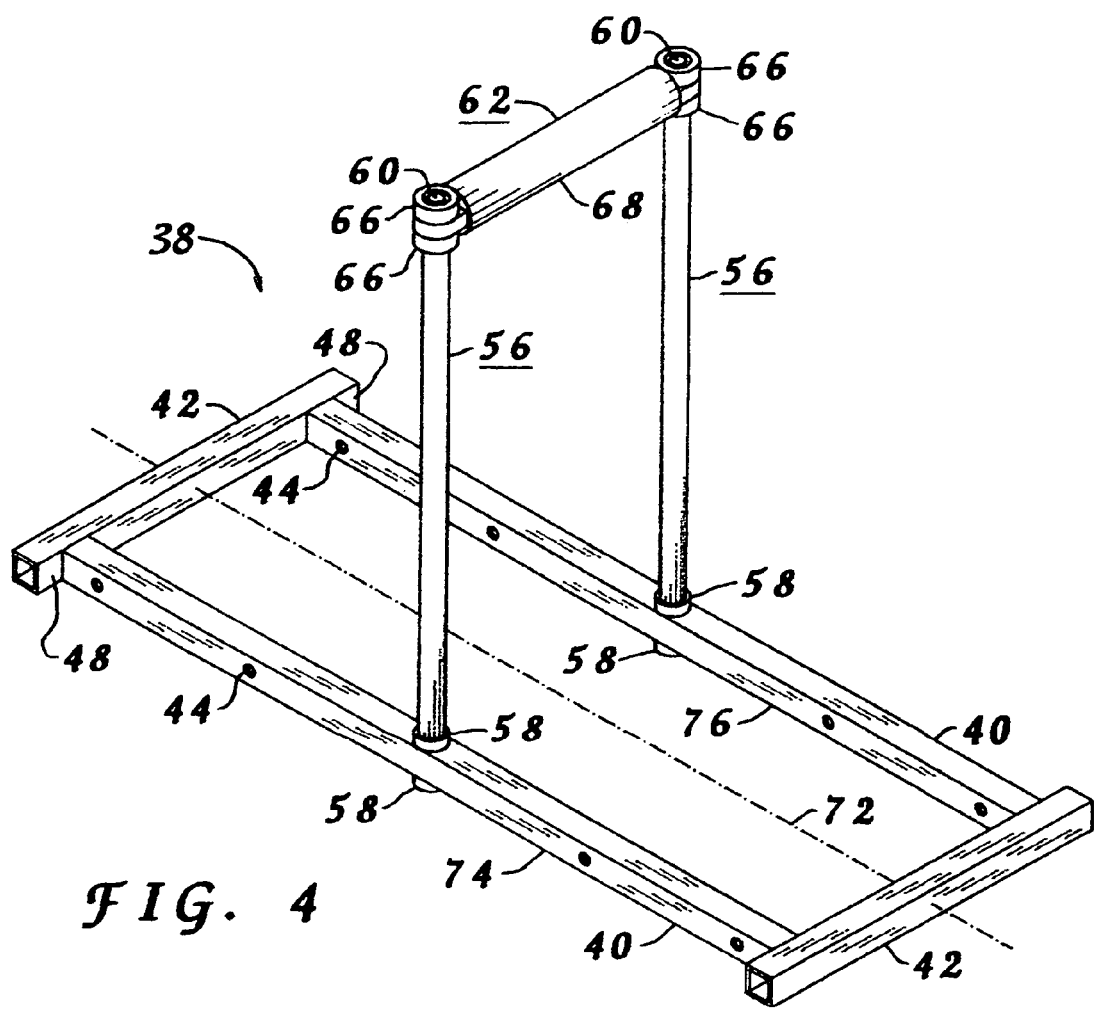

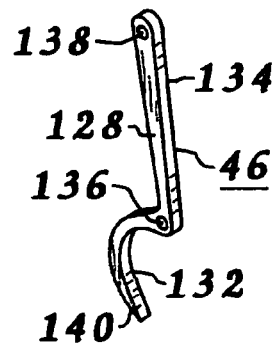
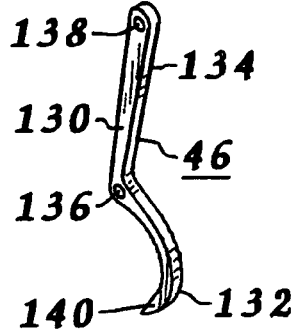
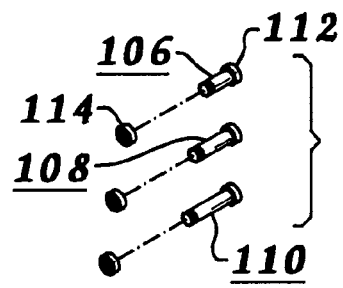
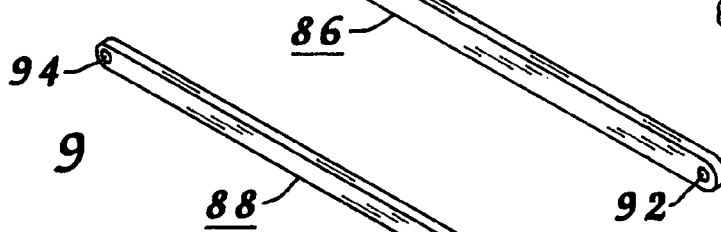
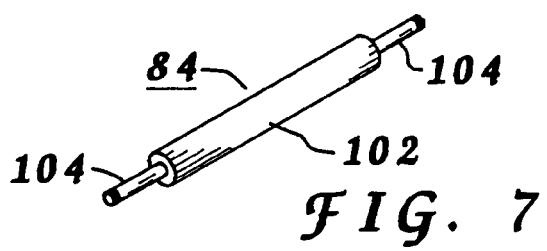

SOD HANDLING DEVICE

BACKGROUND

1. Field of the Invention

Generally, the invention relates to devices to engage and retain for movement a piece of sod. More specifically, the invention relates to such hand held devices which may be readily manipulated by a user.

2. Description of the Prior Art

Sod is grass which is grown at one location, harvested and placed at another location to continue to grow at the second location. Sod is primarily used to instantly have a beautiful yard without having to wait for the normal growing cycle to be completed. Sod is the collection of the soil and roots of grass along with the exposed grass extending upward from the soil.

Numerous methods exist to manipulate sod from the time of cutting of the sod from the ground upon which is has been grown to the time of placement of the sod on the ground upon which it will subsequently grow. There exist two (2) generally styles of sod being a rolled style and a piece style. The rolled style is where the sod is harvested in a long row and stored in roll form for subsequent installation. The piece style is where the sod is harvested in squares, or more commonly rectangles, and stacked on pallets in a natural orientation with the grass facing upward and each of the pieces of sod generally flat. It is known to harvest sod in the roll form and then convert it later into the piece form.

Sod harvesting machines are well known in the art to uniformly slice, to a predetermined depth, under the soil having roots therein while cutting edges along at least two (2) sides to harvest sod from a grow field. At some point cuts are made to separate each piece of sod from the field or from adjacent pieces of sod. Such machines have features to manipulate the cut sod to an orientation for transport, either as a roll or as cut pieces.

In the area of handling sod cut into pieces U.S. Pat. No. 6,112,680 by Hummer discloses manipulating sod by penetrating the piece of sod with a plurality of actuator rods with each rod linearly penetrating the sod at an angle. The actuator rods penetrate the piece of sod from at least two opposing directional angles. The invention of Hummer is clearly intended for large scale machine use and would not be practical, nor an obvious variation, as a hand held sod handling device.

In the area of handling sod cut into pieces U.S. Pat. No. 3,326,592 by Pelton discloses manipulating sod by penetrating the piece of sod with teeth which extend downward from the frame for linear insertion into the piece of sod. Subsequent to such linear insertion of the totality of the teeth, half of the teeth are pivoted in one direction while the other half of the teeth are pivoted in the opposing direction. This arrangement tends to destroy the sod by ripping it apart at all places between each pair of teeth which are displaced away from each other. Additionally, the compression of sod between each pair of teeth which are displaced toward each other damage the piece of sod. The invention of Pelton is clearly intended for large scale machine use and would not be practical, nor an obvious variation, as a hand held sod handling device.

In the area of handling sod during harvesting into sod pieces, U.S. Pat. No. 7,407,362 by Brouwer and Milwain disclose manipulating sod by grasping the grass extending from the surface of the sod. In a brief mention in Brouwer and Milwain, see the paragraph at column 5, lines 23-33, and FIGS. 15 and 16, it is disclosed to penetrate the sod by " . . . hooking part of the thatch of the sod or the soil portion of the slab.". The invention of Brouwer and Milwain, including all possible variations disclosed, is clearly intended for large scale machine use and would not be practical, nor an obvious variation, as a hand held sod handling device.

In an apparent unrelated field, a grapple is disclosed in U.S. Pat. No. 2,572,499 by Light to hoist baled or loose hay, straw or the like, to a stack or in storing the same in barns or other buildings.

Your applicant is unaware of any simple hand held device which assists a user to readily and easily and safely engage, transport and release a piece of sod while minimizing any potential damage such handling might typically entail.

The vast majority of sod installation at a location being sodded occurs with the installer grasping a piece of the sod with both hands and physically picking it up with their hands and carrying it with their hands and releasing it from their hands. Most such installers utilize gloves to protect their hands. Depending upon the length of the exposed grass and the quality of the sod being installed, the installer may grasp the exposed grass within clenched fist and pick up the sod from the top. This technique tends to damage the sod as it exerts the entire weight of the piece of sod to the small areas being engaged by the installer. At other times the installer may grasp the side from opposing edges, typically the short sides of the piece of sod, with their finger tips under the sod and their thumbs above. This technique tends to permit bending of the piece of sod which has the tendency to damage the sod. This technique also applies the entire weight of the piece of sod to the areas being engaged by the installer. A major drawback of the manual installation method involves the installer only being able to manipulate one (1) piece of sod at a time from a stacked location of the sod pieces to be installed to the placement location of the sod being installed. Some installers, in an effort to be more productive, have attempted to convey two (2) pieces of sod at once in a stack. This either involves getting their hands under opposing edges of the lower piece of sod in the stack of two (2) pieces of sod or allowing the stack of two (2) pieces of sod to rest on their forearms. These techniques have proven to fail. In the first instance the weight of the two (2) pieces are too much to retain without damaging the sod at the point of contact with the installer's hands. In the second instance, it is difficult to manipulate their hands and forearms under the two (2) pieces of sod and impossible to place them on the ground at the location of installation unassisted without doing serious damage to the sod. The rare occasions where the second instance works is where another installer remains at the installation location, moving along the ground as installation occurs, and takes the top piece from the installer conveying the two (2) pieces and placing it then taking the second piece from the installer conveying the two (2) pieces and placing it while the installer conveying the sod returns for two (2) more pieces of sod. When this technique is employed often multiple installers will convey sod to the one (1) installer that actually places each piece of sod on the ground.

Various deficiencies exist with all of the known methods of handling pieces of sod during an installation. As can be seen various attempts have been made to provide for large scale machines to handle the pieces of sod while minimizing damage to the piece of sod. These attempts have been less efficient than desired. As such, it may be appreciated that there continues to be a need for a hand held device with engagement members to penetrate the piece of sod from opposing directions with minimal disturbance of the sod, to evenly distribute the weight of the piece of sod over the engagement members during manipulation of the piece of sod and to release the piece of sod cleanly with minimal disturbance of the sod by the engagement members. Additionally, there continues to be a need for a hand held device which an installer may use two (2) of at a time to install two (2) pieces of sod during each cycle of motion from a stacked location of the sod to be installed to the placement location of the two (2) pieces of sod. The present invention substantially fulfills these needs.

SUMMARY

In view of the foregoing disadvantages inherent in the known methods of handling individual pieces of sod, your applicant has devised a sod handling device to provide for a user of the device to engage, to transport and to release a piece of sod all while the piece of sod is in a generally natural horizontal orientation. Applicable pieces of sod have an upper surface and a base layer. The upper surface of the piece of sod has grass thereat while the base layer of the piece of sod is generally formed of soil and roots from the grass. The sod handling device has a handle, a plurality of sod penetration members, engagement means and release means. The handle permits the user to carry the sod handling device about. Each of the sod penetration members have a neutral orientation and a sod engagement orientation relative to the overall sod handling device. The orientations are generally at opposing ends of a movement range for the respective sod penetration member. Structural components provide for the engagement means which provide for an engaging displacement of the plurality of sod penetration members generally from their respective neutral orientations to their respective sod engagement orientations subsequent to a placement of the sod handling device relative to the piece of sod. This provides for the sod penetration members to penetrate and engage the piece of sod through the grass of the upper surface and into the base layer to secure the piece of sod relative to the sod handling device. Structural components provide for the release means which provide for a releasing displacement of the plurality of sod penetration members generally from their respective sod engagement orientations to their respective neutral orientations. This provides for the sod penetration members to disengage from the piece of sod to release the piece of sod from the sod handling device. The sod handling device may be operated by a user using just one (1) hand thus permitting the user to use two (2) sod handling devices simultaneously to double the installation capacity of the user.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a hand held sod handling device to engage, move and release a piece of sod without inflicting any apparent damage to the piece of sod.

Other objects include;

a) to provide for an arching penetration and withdrawal of the piece of sod by a plurality of sod penetration members of the sod handling device.

b) to provide for the sod penetration members to be distributed in two direction sets to enter and to leave the sod in opposing directional orientations to secure and release the piece of sod relative to the sod handling device.

c) to provide for the sod penetration members to operate in widely distributed pairs with each of the sod penetration members of a respective pair operating in an opposing directional displacement.

d) to provide for a simple dual handle arrangement where an upper handle is utilized to carry the sod handling device until the sod is engaged on the sod handling device where a lower handle is then utilized to carry the sod handling device during transport of the piece of sod and where a retention of the upper handle while releasing lower handle causes a clean release of the piece of sod from the sod handling device.

e) to provide for the user to fully operate the sod handling device using only one of their hands.

f) to provide for the user to convey a piece of sod utilizing the sod handling device with the device and the piece of sod at the user's side in a far less stressful orientation than that orientation currently utilized by installer carrying the piece of sod in front of the user using both hands.

g) to provide for the user to alternate use of the sod handling device with each of their arms during installation of the sod to reduce fatigue and improve productivity.

h) to provide for the user to operate two (2) sod handling devices simultaneously to convey and install two (2) pieces of sod during each installation cycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 2a and FIG. 2b are side elevational views of the sod handling device in the orientations depicted in FIG. 1a and FIG. 1b respectively.

FIG. 3a and FIG. 3b are end elevational views of the sod handling device in the orientations depicted in FIG. 1a and FIG. 1b respectively.

FIG. 4 is a perspective view of fixed portions of a frame of the sod handling device.

FIG. 5 is an exploded perspective view of portions of a fixed handle assembly of the sod handling device.

FIG. 6 is a perspective view of a sliding upright member.

FIG. 7 is a perspective view of an upper handle.

FIG. 8 is a perspective view of a main control linkage.

FIG. 9 is a perspective view of a coupling linkage.

FIG. 10a and FIG. 10b are perspective views of a first and second side of a sod penetration member.

FIG. 11 is a perspective view of various pivotal couplings assemblies.

FIG. 12 is a perspective view an upright member frame anchor.

FIG. 13 is a perspective view an upper handle anchor.

DESCRIPTION

Figure 1A:
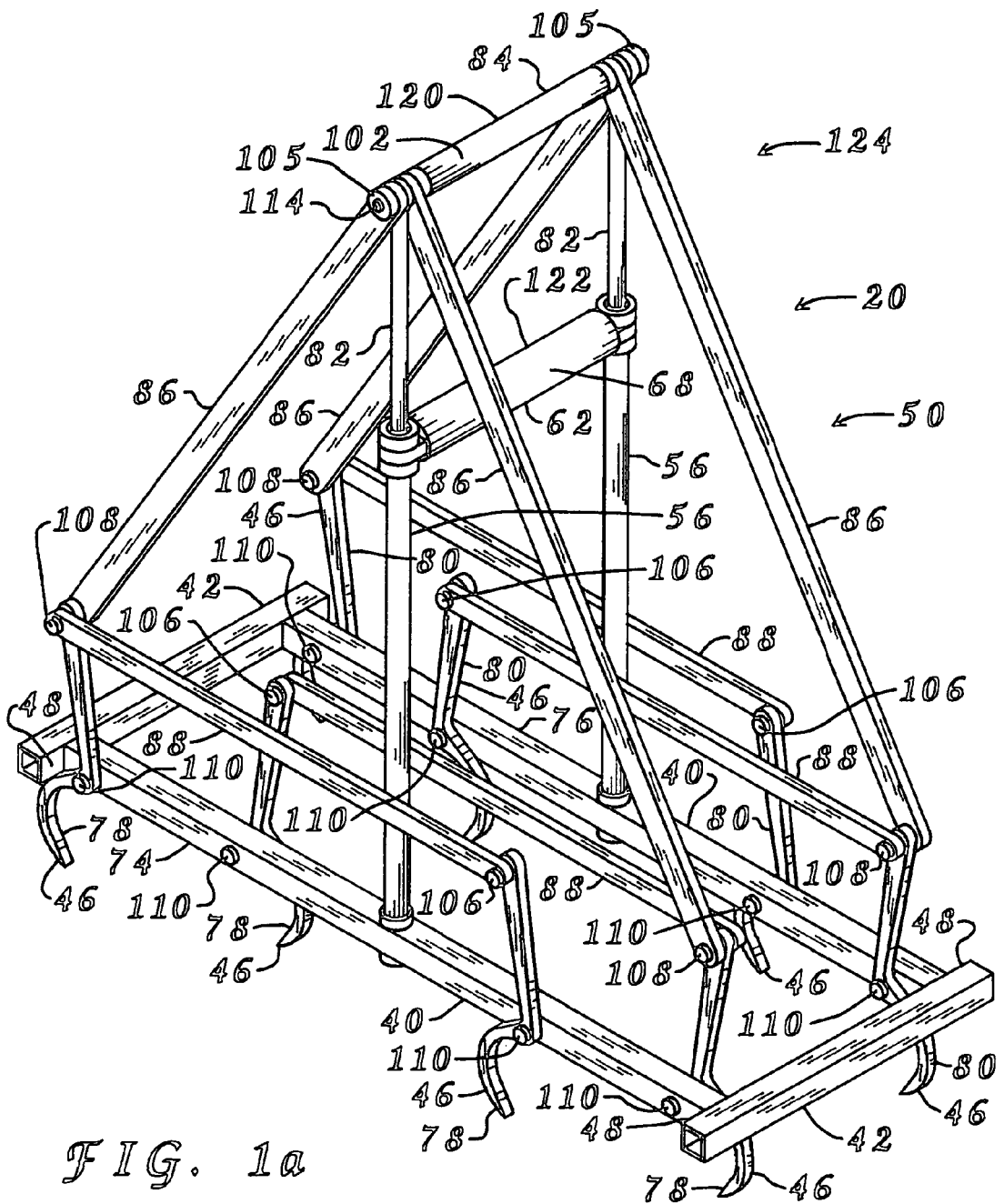
FIG. 1a and FIG. 1b are perspective views of a sod handling device in opposing operational orientations.

Many different devices having features of the present invention are possible. The following description describes the preferred embodiment of select features of those devices and various combinations thereof. These features may be deployed in various combinations to arrive at various desired working configurations of devices.

Reference is hereafter made to the drawings where like reference numerals refer to like parts throughout the various views.

Overview

A sod handling device 20, shown complete in FIG. 1a through FIG. 3b, provides for a user, not shown, of sod handling device 20 to engage, to transport and to release a piece of sod 22, shown in FIG. 2a and FIG. 2b. The engagement, transport and release of piece of sod 22 occurs while piece of sod 22 is in a generally natural horizontal orientation 24.

Piece of sod 22 has an upper surface 26 and a base layer 28. Upper surface 26 of piece of sod 22 has grass 30 thereat. Base layer 28 of piece of sod 22 is generally formed by soil 32 and roots 34 from grass 30 therein. Piece of sod 22 is a standard piece of sod, as conventionally known in the art, which has a thickness 36 of base layer 28.

Sod handling devices having features of the present invention may be formed by various manufacturing methods and from various materials. Ideally, the parts will be of a suitably strong and durable nature which will resist the adverse effects of the outdoors operating environment to which devices having features of the present invention will be exposed.

The purpose of the present invention is to permit a person handling the sod handling device to securely engage a single piece of sod with the sod handling device, readily and comfortably manipulate the piece of sod using the sod handling device from a first location to a second location and to accurately position the piece of sod at the time of release of the piece of sod from the sod handling device. All of this ideally will occur without concern for premature release of the piece of sod from the sod handling device and without the sod handling device unduly damaging the piece of sod at any time, including during engagement, transport and release. The release of the piece of sod from the sod handling device may occur subsequent to placement of the piece of sod on the ground at a desired position or with the piece of sod elevated above the ground. In either instance it is necessary that release of the piece of sod from the sod handling device occur rapidly where little or no trauma, or other damage, will be inflicted upon the piece of sod.

The person installing the sod will not have to hold the piece of sod in front of them during conveyance of the piece of sod but rather will hold the piece of sod at their side in a much less stressful body orientation. The person installing the sod may utilize a single sod handling device during installation or may utilize a pair of sod handling devices to improve efficiency and productivity.

The term engagement means refers to any method, and any structural arrangement of parts, to provide for an engaging displacement of a plurality of sod penetration members generally from neutral orientation of sod handling device to sod engagement orientation of sod handling device subsequent to a placement of sod handling device relative to piece of sod. This provides for sod penetration members to penetrate and engage the piece of sod through the grass of the upper surface and into the base layer to secure the piece of sod relative to sod handling device.

The term release means refers to any method, and any structural arrangement of parts, to provide for a releasing displacement of the plurality of sod penetration members generally from sod engagement orientation of sod handling device to neutral orientation of sod handling device. This provides for the sod penetration members to disengage from the piece of sod to release the piece of sod from sod handling device.

Frame

Sod handling device 20 has a fixed frame 38, various control linkages and various couplings. Fixed frame 38, see FIG. 4, has a pair of opposing longitudinal mounting members 40 and a pair of opposing end coupling members 42. Each longitudinal mounting member 40 has a plurality of mounting passages 44 therethrough. Each mounting passage 44 provides for mounting of a respective sod penetration member 46. As depicted, end coupling members 42 preferably extend beyond the extent of longitudinal mounting members 40 to provide for a plurality of blocking stops 48 which act with select sod penetration members 46 to limit an operational range of motion of sod handling device 20. These limits are best shown in FIG. 2a for a neutral orientation 50 of sod handling device 20 and in FIG. 2b for a sod engagement orientation 52 of sod handling device 20. Orientations 50 and 52 for sod handling device 20 place the plurality of sod penetration members 46 generally at their opposing ends of a respective pivotal movement range. Fixed frame 38 has a sod contact surface 54 for placement against upper surface 26 of piece of sod 22, see FIG. 2b. Extending upward from a generally central location on each longitudinal mounting member 40 is a fixed upright member 56, best shown in FIG. 4, which extends through a passageway therethrough, not shown. Each fixed upright member 56 is secured therein utilizing an opposing pair of upright member frame anchors 58, best shown in FIG. 4 and FIG. 12. Each longitudinal mounting member 40 has a containment cavity 60, see FIG. 4. A lower fixed handle 62, also referred to herein as lower member of handle, has opposing securing passages 64, see FIG. 5, which each receive one (1) fixed upright member 56. Lower fixed handle 62 is secured to each of the opposing fixed upright members 56 utilizing opposing fixed handle anchors 66, see FIG. 4 and FIG. 5. Lower fixed handle 62 has a user contact area 68 which will be engaged by the user in a weight bearing manner while sod handling device 20 is transporting piece of sod 22.

Fixed frame 38 has at a lower extent a sod contact plane 70, see FIG. 2a, which generally contacts upper surface 26 of piece of sod 22 during placement of sod handling device 20 relative to piece of sod 22. The operational limits of sod contact plane 70 have a longitudinal orientation 72, see FIG. 4, with a first perimeter 74 and a second perimeter 76 positioned on opposing side of longitudinal orientation 72. The plurality of sod penetration members 46 can be defined as having a first operational set 78 and a second operational set 80. First operational set 78 is positioned generally along first perimeter 74 while second operational set 80 is positioned generally along second perimeter 76.

Control Linkages

The various control linkages provide for control over manipulation of sod handling device 20 by the user. Numerous configurations of control linkages may be employed to provide this feature on devices having features of the present invention. The control linkages depicted operate in a synchronized manner to control movement of all deployed sod penetration members 46 simultaneously.

The control linkages include two (2) opposing sliding upright members 82, an upper handle 84, four (4) main control linkages 86, four (4) coupling linkages 88 and eight (8) sod penetration members 46. Each main control linkage 86 has an upper pivotal aperture 90 and a lower pivotal aperture 92. Each coupling linkage 88 has an inner pivotal aperture 94 and an outer pivotal aperture 96. Each sliding upright member 82 has a contained portion 98 and an anchoring aperture 100. Each contained portion 98 of sliding upright member 82 is retained in a sliding manner within containment cavity 60 of a respective longitudinal mounting member 40. Upper handle 84, also referred to herein as upper member of handle, has a user contact area 102 and opposing securing shafts 104. Each securing shaft 104 penetrates anchoring aperture 100 of a respective sliding upright member 82, along with two (2) upper pivotal apertures 90 of two (2) main control linkages 86, and is secured thereto utilizing various upper handle anchors 105, see FIG. 3a, FIG. 3b and FIG. 13.

Couplings

The various couplings provide for non binding coupling of the various moving components of sod handling device 20. Numerous configurations of couplings may be employed to provide this feature on devices having features of the present invention. The couplings depicted include various lengths, see coupling assemblies 106, 108 and 110 shown in FIG. 11, to accommodate non binding, relatively loose, securement of the various moving parts relative to each other and the various moving parts relative to various fixed parts. This non binding securement ensures uniform operation of sod handling device 20 throughout a work life. It being recognized that sod handling devices having features of the present invention will operate in dirty and damp environments during use to move and lay sod. One example of such a coupling is coupling assembly 106 having a bolt 112 which receives a locking nut 114. Bolt 112 is configured, as conventionally known in the art, to receive locking nut 114 to a maximum depth. Coupling assemblies 106, 108 and 110, see FIG. 1a and FIG. 1b, secure various of the portions of sod handling device 20 together. Spacers, conventionally known and not shown, may be positioned between the various secured portions to ensure proper spacing to prevent binding or rubbing of parts adjacent their respective couplings, if desired.

Connections

Figure 1B:
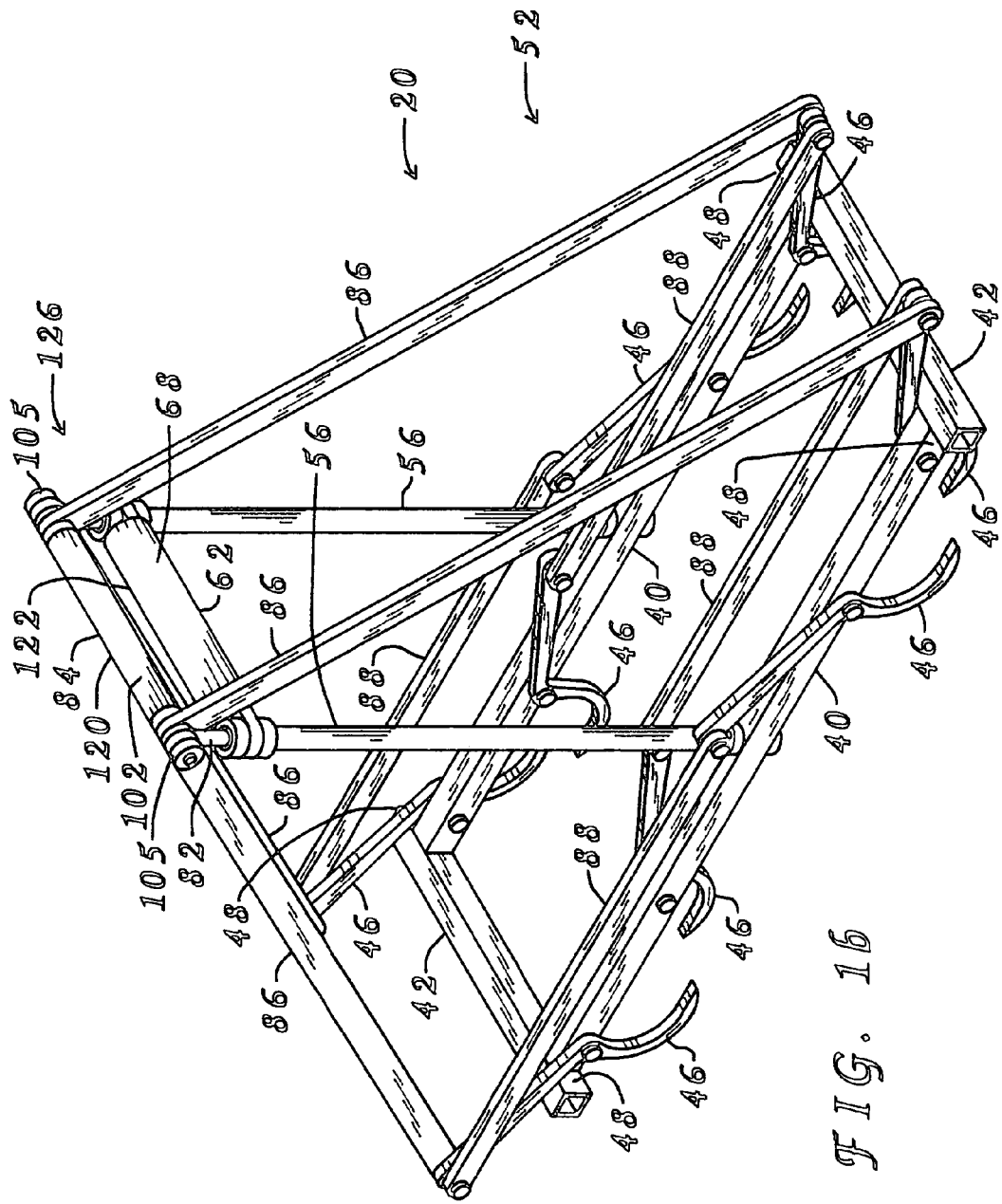

Referring now specifically to FIG. 4, FIG. 1a and FIG. 1b, fixed frame 38 has secured thereto eight (8) sod penetration members 46 in four (4) directional pairs with each directional pair connected by one (1) coupling linkage 88. Each coupling linkage 88 also has secured thereto a respective main control linkage 86. Each securing shaft 104 of upper handle 84 also has attached thereto a respective sliding upright member 82 and two (2) main control linkages 86. This provides for displacement of the four (4) main control linkages 86 during movement of upper handle 84 toward and away from lower fixed handle 62. Therefore, movement of upper handle 84 toward and away from lower fixed handle 62 controls movement of main control linkages 86 which in turn controls movement of coupling linkages 88 which in turn control movement of sod penetration members 46.

Range of motion of sod handling device 20 may be limited in various manners. As depicted, blocking stops 48 and contacting sod penetration members 46 may be employed to limit the range of motion. Alternatively, structural limits may be imposed between fixed upright member 56 and sliding upright member 82 to limit the range of motion. Numerous other structural arrangements on sod handling device 20 may be employed to provide this desired feature.

Operation

Upper handle 84 and lower fixed handle 62 cooperate to form a handle assembly. Handle assembly has a first hand contact portion 120 and a second hand contact portion 122. At various times of use of sod handling device 20 the user engages first hand contact portion 120, at other times the user engages second hand contact portion 122 and at other times the user engages both first hand contact portion 120 and second hand contact portion 122. First hand contact portion 120 and second hand contact portion 122 have a neutral spacing orientation 126, see FIG. 2a and FIG. 3a, where handle assembly positions the control linkage assembly in an orientation where sod penetration members 46 are maintained in neutral orientation 50. First hand contact portion 120 and second hand contact portion 122 have a sod engagement spacing orientation 126, see FIG. 2b and FIG. 3b, where handle assembly positions the control linkage assembly in an orientation where sod penetration members 46 are maintained in sod engagement orientation 52 of sod handling device 20. While being manipulated without sod engaged by sod handling device 20, upper handle 84 is normally utilized by the user to bear the weight of sod handling device 20. This arrangement provides for sod handling device 20 to be in neutral orientation 50, see FIG. 1a, FIG. 2a and FIG. 3a. While being manipulated with piece of sod 22 engaged by sod handling device 20, lower fixed handle 62 is normally utilized to bear weight of sod handling device 20 and piece of sod 22, with surrounding engagement of upper handle 84, if desired. This arrangement provides for sod handling device 20 to be in sod engagement orientation 52, see FIG. 1b, FIG. 2b and FIG. 3b.

Referring now generally to FIG. 1a through FIG. 3b, FIG. 10a and FIG. 10b, each sod penetration member 46 has a first side 128 and second side 130. Each sod penetration member 46 further has a sod penetration portion 132, an extension portion 134, a pivotal aperture 136 and a controlling aperture 138. Sod penetration portion 132 has a distal tip portion 140 and a curvature 142. Distal tip portion 140 penetrates piece of sod 22 during engagement of piece of sod 22. Preferably, each sod penetration member 46 penetrates base layer 28 of piece of sod 22 to a depth generally less than thickness 36 of base layer 28 of piece of sod 22.

While each sod penetration member 46 will have a neutral orientation and a sod engagement orientation, in the preferred embodiment the collection of sod penetration members 46 will move together in a synchronized manner on sod handling device 20.

Distal tip portion 140 of each sod penetration member 46 will have a definable directional orientation while in at least sod engagement orientation 52 of sod handling device 20. Preferably a portion of each sod penetration member 46 at, or near, their respective distal tip portion 140 will be generally parallel to upper surface 26 of piece of sod 22 while in sod engagement orientation 52 of sod handling device 20 with piece of sod 22. It being understood that the term generally parallel is being applied to a curved member without loss of understanding of the principle. Due to the preferred pivotal movement of sod penetration members 46 the movement range of each sod penetration member 46 occurs generally in an arcing displacement motion, see change from FIG. 1a to FIG. 1b and change from FIG. 2a to FIG. 2b.

In the most preferred embodiment depicted, four (4) counteracting pairs of sod penetration members 46 will be positioned relative to corners of fixed frame 38 about sod contact surface 54. This arrangement provides for several definable sets of sod penetration members. A first and second definable set of sod penetration members involve those defined by their directional displacement of the sod penetration members. Each pair of adjacent sod penetration members 46 which act in opposing directional displacement directions on piece of sod 22. Four (4) of these sets is ample to handle sod of conventional size, thickness and weight.

Referring now to directional displacement of the plurality of sod penetration members 46, a first set of sod penetration members 142 and a second set of sod penetration members 144 exist. First set of sod penetration members 142 operate in a first movement direction 146 while second set of sod penetration members 144 operate in a second movement direction 148. First movement direction 146 is generally opposed to second movement direction 148.

Preferably each sod penetration member 46 is positioned in close proximity to sod contact surface 54 to provide for a cooperation to occur between sod contact surface 54 and each sod penetration member 46 to ensure a proper penetration of piece of sod 22 by each sod penetration member 46 during an engaging displacement of the plurality of sod penetration members 46 by ensuring proper placement of each sod penetration member 46 prior to sod handling device 20 seizing piece of sod 22. Due to a tendency of sod penetration members 46 during insertion into piece of sod 22 to draw portions of piece of sod 22 upward and secure contact is ensured between sod contact surface 54 and piece of sod 22 near each sod penetration member 46. Preferably, each pair of sod penetration members 46 which move in opposing movement directions during displacement will be offset from each other, shown in FIG. 1a and FIG. 1b, while moving along parallel pivotal movement ranges. This is accomplished by positioning the pair of sod penetration members 46 on opposing sides of the structure forming sod contact surface 54.

FIG. 1a, FIG. 2a and FIG. 3a depict sod handling device 20 in neutral orientation 50 which will be the orientation while sod handling device 20 is being carried about utilizing upper handle 84. While in neutral orientation 50 sod handling device 20 may be positioned on piece of sod 22 and an engaging displacing movement of upper handle 84 toward piece of sod 22 causes an engaging displacement of the plurality of sod penetration members 46, see difference between FIG. 1a and FIG. 1b and between FIG. 2a and FIG. 2b, to secure piece of sod 22 relative to sod handling device 20. This provides for a fluid and natural use of sod handling device 20 where the user carries sod handling device 20 to piece of sod 22 then places sod handling device 20 on piece of sod 22 then secures piece of sod 22 relative to sod handling device 20 by continuing movement of the hand carrying sod handling device 20 downward while the user continues to contact upper handle 84. Following this fluid and natural engagement the user engages lower fixed handle 62 and lifts sod handling device 20 and piece of sod 22 utilizing lower fixed handle 62. As lower fixed handle 62 is fixed on sod handling device 20, and as a balancing of the moveable parts exist, sod penetration members 46 remain in their securement orientation to retain piece of sod 22 while the user bears the weight on lower fixed handle 62. A natural positioning of the hand of the user around both lower fixed handle 62 and upper handle 84 ensures that sod handling device 20 remains in sod engagement orientation 52 during conveyance of piece of sod 22 utilizing sod handling device 20. Thus during engagement of piece of sod 22 by sod handling device 20 upper handle 84 and lower fixed handle 62 are retained in a close proximity to each other by the user to retain the plurality of sod penetration members 46 in sod engagement orientation 52 of sod handling device 20 during transport of piece of sod 22 utilizing sod handling device 20.

While in sod engagement orientation 52, see FIG. 1b, FIG. 2b and FIG. 3b, sod handling device 20 will retain piece of sod 22 and a releasing displacing movement of upper handle 84 away from piece of sod 22 causes a disengaging displacement of the plurality of sod penetration members 46, see difference between FIG. 1b and FIG. 1a and between FIG. 2b and FIG. 2a, to release piece of sod 22 relative to sod handling device 20. This movement of upper handle 84 away from piece of sod 22 during the releasing displacement of the plurality of sod penetration members 46 causes the releasing displacement of the plurality of sod penetration members 46 to release piece of sod 22 relative to sod handling device 20. This provides for a fluid and natural use of sod handling device 20 where the user carries sod handling device 20 with piece of sod 22 secured thereat then releases lower fixed handle 62 while retaining upper handle 84. Following this fluid and natural disengagement the user is free to re-engage piece of sod 22 just released or to engage another piece of sod 22.

Preferably the release means will utilize a gravity biased release of piece of sod 22 from sod handling device 20 utilizing from a weight of piece of sod 22 to assist the releasing displacement of the plurality of sod penetration members 46 from sod engagement orientation 52 of sod handling device 20 to neutral orientation 50 of sod handling device 20.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sod handling device to provide for a user of the device to engage, to transport and to release a piece of sod all while the piece of sod is in a generally natural horizontal orientation, the piece of sod having an upper surface and a base layer, the upper surface of the piece of sod having grass thereat, the base layer of the piece of sod generally formed by soil and roots from the grass therein, the sod handling device comprising:
 a) a handle to permit the user to carry the sod handling device about;
 b) a plurality of sod penetration members, each sod penetration member having a neutral orientation and a sod engagement orientation generally at opposing ends of a movement range;
 c) engagement means to provide for an engaging displacement of the plurality of sod penetration members generally from their respective neutral orientations to their respective sod engagement orientations subsequent to a placement of the sod handling device relative to the piece of sod wherein the sod penetration members penetrate and engage the piece of sod through the grass of the upper surface and into the base layer to secure the piece of sod relative to the sod handling device;

d) release means to provide for a releasing displacement of the plurality of sod penetration members generally from their respective sod engagement orientations to their respective neutral orientations wherein the sod penetration members disengage from the piece of sod to release the piece of sod from the sod handling device.

2. The sod handling device defined in claim 1 wherein a standard piece of sod has a thickness of the base layer and wherein the sod penetration members penetrate the base layer of the piece of sod to a depth generally less than the thickness of the base layer of standard piece of sod.

3. The sod handling device defined in claim 1 wherein each of the sod penetration members has a distal end which penetrates the piece of sod and wherein each of the sod penetration members has a curvature at the distal end which penetrates the piece of sod.

4. The sod handling device defined in claim 1 wherein each sod penetration member has a distal tip portion having a definable directional orientation and wherein each respective distal tip portion of each respective sod penetration member is generally parallel to the upper surface of the piece of sod while in their respective sod engagement orientation while the sod handling device is in an engaged operational orientation with the piece of sod.

5. The sod handling device defined in claim 1 wherein the movement range of each sod penetration member occurs generally in an arcing displacement motion.

6. The sod handling device defined in claim 1 wherein the plurality of sod penetration members further comprise a first set of sod penetration members and a second set of sod penetration members and wherein the first set of sod penetration members operate in a first movement direction and the second set of sod penetration members operate in a second movement direction and wherein the first movement direction generally opposes the second movement direction.

7. The sod handling device defined in claim 1 further comprising a sod contact plane which generally contacts the upper surface of the piece of sod during the placement of the sod handling device relative to the piece of sod, the sod contact plane having a longitudinal orientation with a first perimeter and a second perimeter positioned on opposing side of the longitudinal orientation and wherein the plurality of sod penetration members further comprise a first operational set and a second operational set with the first operational set positioned generally along the first perimeter and the second operational set positioned generally along the second perimeter.

8. The sod handling device defined in claim 1 further comprising a sod surface contact surface to engage the upper surface of the piece of sod during the placement of the sod handling device relative to the piece of sod.

9. The sod handling device defined in claim 8 wherein each of the sod penetration members is in close proximity to the sod surface contact surface wherein a cooperation occurs between the sod surface contact surface and each of the sod penetration members to ensure a proper penetration of the piece of sod by each sod penetration member during the engaging displacement.

10. The sod handling device defined in claim 1 wherein the handle further comprises an upper member and a lower member and wherein an engaging displacing movement of the upper member on the sod handling device toward the piece of sod during the engaging displacement of the plurality of sod engagement members causes the engaging displacement of the plurality of sod engagement members to secure the piece of sod relative to the sod handling device and wherein the lower member is utilized by the user to bear weight during the transport of the piece of sod utilizing the sod handling device and wherein a releasing displacing movement of the upper member on the sod handling device away from the piece of sod during the releasing displacement of the plurality of sod engagement members causes the releasing displacement of the plurality of sod engagement members to release the piece of sod relative to the sod handling device.

11. The sod handling device defined in claim 10 wherein the upper member of the handle and the lower member of the handle are retained in a close proximity to each other by the user to retain the plurality of sod penetration members in their sod engagement orientations during transport of the piece of sod utilizing the sod handling device.

12. The sod handling device defined in claim 10 further comprising a sod surface contact surface to engage the upper surface of the piece of sod during the placement of the sod handling device relative to the piece of sod and wherein the lower member of the handle is generally stationary on the sod handling device relative to the sod surface contact surface.

13. The sod handling device defined in claim 1 wherein the release means utilizes a gravity biased release of the piece of sod from the sod handling device to assist the releasing displacement of the plurality of sod penetration members from their respective sod engagement orientations to their respective neutral orientations.

14. A sod handling device to provide for a user of the device to engage a piece of sod, to transport the piece of sod and to release the piece of sod all while the piece of sod is in a generally natural horizontal orientation, the piece of sod having an upper surface and a base layer, the upper surface of the piece of sod having grass thereat, the base layer of the piece of sod generally formed by soil and roots from the grass therein, the sod handling device comprising:

a) a plurality of sod penetration members, each sod penetration member having a respective neutral orientation and a respective sod engagement orientation generally at opposing ends of a respective pivotal movement range, the plurality of sod penetration members separated into:
  i) a first group of sod penetration members having an engagement displacement directional orientation;
  ii) a second group of sod penetration members having an engagement displacement directional orientation;
  and wherein the engagement displacement directional orientation of the first group of sod penetration members generally oppose the engagement displacement directional orientation of the second group of sod penetration members;

b) a control linkage assembly to control a respective pivotal movement within the respective pivotal movement range of each of the plurality of sod penetration members between each respective neutral orientation and each respective sod engagement orientation;

c) a handle assembly to permit the user to carry the sod handling device about, to control the sod handling device during the engagement of the piece of sod, to control the sod handling device during the transport of the piece of sod, to control the sod handling device during the release of the piece of sod, the handle assembly controlling the control linkage assembly, the handle assembly having:
  i) a first hand contact portion which the user engages during at least a portion of an interaction of the user with the sod handling device;

ii) a second hand contact portion which the user engages during at least a portion of an interaction of the user with the sod handling device;

and wherein the first hand contact portion and the second hand contact portion having a neutral spacing orientation where the handle assembly positions the control linkage assembly in an orientation where the sod penetration members are maintained in their respective neutral orientation;

and wherein the first hand contact portion and the second hand contact portion having a sod engagement spacing orientation where the handle assembly positions the control linkage assembly in an orientation where the sod penetration members are maintained in their respective sod engagement orientation.

15. The sod handling device defined in claim 14 wherein a standard piece of sod has a thickness of the base layer and wherein the sod penetration members penetrate the base layer of the piece of sod to a depth generally less than the thickness of the base layer of standard piece of sod.

16. The sod handling device defined in claim 14 wherein each of the sod penetration members has a distal end which penetrates the piece of sod and wherein each of the sod penetration members has a curvature at the distal end which penetrates the piece of sod.

17. The sod handling device defined in claim 14 wherein the pivotal movement range of each sod penetration member occurs generally in an arcing displacement motion.

18. The sod handling device defined in claim 14 wherein the release of the piece of sod from the sod handling device is assisted by a gravity bias from a weight of the piece of sod.

19. The sod handling device defined in claim 14 wherein the first group of sod penetration members and the second group of sod penetration members are positioned in pairs of sod penetration members with each pair of sod penetration members offset from each other while moving along parallel pivotal movement ranges.

* * * * *